United States Patent
Rao

[11] Patent Number: 6,019,229
[45] Date of Patent: Feb. 1, 2000

[54] SELF-CENTERING, FLOATING RETAINER FOR SPIN-ON FILTER

[75] Inventor: Prabhakar B. Rao, Cookeville, Tenn.

[73] Assignee: Fleetguard, Inc., Nashville, Tenn.

[21] Appl. No.: 08/993,285

[22] Filed: Dec. 18, 1997

[51] Int. Cl.$^7$ .............................................. B01D 35/02
[52] U.S. Cl. .................................. 210/443; 210/DIG. 17; 277/918
[58] Field of Search ...................... 210/440, 443, 210/444, 450, DIG. 17; 55/498, 502; 277/313, 596, 918, 611

[56] References Cited

U.S. PATENT DOCUMENTS

| | | |
|---|---|---|
| 3,066,803 | 12/1962 | Seils, Jr. . |
| 3,279,805 | 10/1966 | Quinson ................................... 277/611 |
| 3,282,429 | 11/1966 | Wood et al. . |
| 3,557,963 | 1/1971 | Offer ....................................... 210/443 |
| 3,589,517 | 6/1971 | Palmi . |
| 4,345,739 | 8/1982 | Wheatley ................................. 251/358 |
| 4,632,682 | 12/1986 | Erdmannsdorfer . |
| 4,832,844 | 5/1989 | Ayers . |
| 4,969,994 | 11/1990 | Misgen et al. . |
| 4,992,166 | 2/1991 | Lowsky et al. . |
| 5,180,490 | 1/1993 | Eihusen et al. . |
| 5,342,511 | 8/1994 | Brown et al. . |
| 5,525,226 | 6/1996 | Brown et al. . |

FOREIGN PATENT DOCUMENTS

| | | |
|---|---|---|
| 0121978A2 | 10/1984 | European Pat. Off. . |
| 1.165.203 | 12/1956 | France . |
| 63-162009 | 7/1988 | Japan ...................................... 210/443 |
| 2195914A | 10/1987 | United Kingdom . |

*Primary Examiner*—Matthew O. Savage
*Attorney, Agent, or Firm*—Woodard, Emhardt, Naughton, Moriarty & McNett

[57] ABSTRACT

A fluid filter for filtering a circulating fluid includes an outer shell having a closed first end and opposite thereto an open second end which is defined by a peripheral edge. The outer shell further includes a surrounding sidewall which defines a hollow interior and a filter cartridge is positioned within the hollow interior. A nutplate is positioned in the open second end and is assembled to the outer shell with the peripheral edge of the outer shell being formed over a portion of the nutplate. A floating annular retainer is positioned adjacent the nutplate and in cooperation with the formed peripheral edge creates an annular receiving channel. An annular gasket is placed in the receiving channel and is sized such that there is a side-to-side compressive fit established between the annular gasket and the retainer and a similar compressive fit is established between the annular gasket and formed peripheral edge.

19 Claims, 2 Drawing Sheets

SELF-CENTERING, FLOATING RETAINER FOR SPIN-ON FILTER

BACKGROUND OF THE INVENTION

The present invention relates in general to spin-on filters which are designed to threadedly assemble to a mounting head and which include an annular face gasket. More specifically the present invention relates to the design of a floating retainer for the support and positioning of the annular face gasket relative to the nutplate and outer shell.

Spin-on fluid filters which are designed to threadedly assemble onto a mounting head of an engine typically include an outer shell, nutplate, filter cartridge, and annular face gasket. The connection or assembly of the outer shell to the nutplate is normally achieved by creating a sealed interface in one of two ways. A first method or way involves the creation of an annular interlocking seam between the metal of the shell and the metal of the nutplate. In this approach, adhesive may be applied between the formed and interlocking metal edges or lips of the two members to improve the security or integrity of the interlocking seam. A corollary to this method is to use a retainer for the gasket and interlock the outer peripheral edge of the retainer with the edge (metal) of the outer shell. In this approach, the nutplate is then captured by some other arrangement.

The second method or way involves forming the free peripheral edge of the outer shell around and over the outer peripheral edge of the nutplate. This "seamless" approach is intended to both capture the nutplate and provide a sealed interface between the nutplate and the outer shell. Since the internal pressure which must be handled by the fluid filter can reach relatively high levels, the mechanical connection between the outer shell and the nutplate will not always be sufficient to provide a secure seal. In this regard, a "secure" seal is one which is liquid-tight. As a means of preventing leakage from within the filter and through the interface between the outer shell and the nutplate, an annular gasket is typically used.

In U.S. Pat. No. 4,969,994 which issued Nov. 13, 1990 to Misgen et al., the outer shell is attached to the nutplate (see FIG. 3 of this patent) and an annular groove is formed in the nutplate for receipt of the annular gasket (item 134). The Misgen et al. patent also discloses a rollover seam design which is identified as "prior art" in FIG. 1 of the '994 patent. The rollover seam is created between the shell and the retainer or plate (12) and the retainer is shaped with a groove for receipt of the face gasket. In both styles disclosed in the Misgen et al. patent, FIGS. 1 and 3, the annular groove for receiving the annular face seal is fixed in size and position, causing a fairly precise shaping and sizing requirement for the gasket, which is to be received and retained in the groove.

While the two methods or approaches which have been described for connecting the outer shell and the nutplate (or retainer) for assembly of an annular gasket are regarded as typical, there are a number of related design considerations. For example, the metal thickness of the shell is one consideration, noting that if the thickness is increased, the interlocking seam with a nutplate or retainer has less risk of fluid bleeding therethrough. Since the interior of the filter will see high pressure and certain peak pressures, if a heavier or thicker metal is used for the outer shell, then when that metal is formed into an interlocking seam in combination with the metal of either the nutplate or the retainer, it is a more secure interface with less chance of leakage. There is of course a cost trade off when going to a thicker walled shell. The thickness of the nutplate is also a related design consideration. Since nutplates of the type used in fluid filters are typically metal stampings, there are certain limitations on the thickness and this is particularly significant when the gasket groove is to be formed in the nutplate. With a thicker nutplate there is less deflection under high pressure and with less deflection of the nutplate there is less risk of leakage. Ideally, a thicker nutplate will be used in order to withstand the higher static burst pressures, but the trade off is the difficulty or inability of forming (i.e., stamping) the required shapes and contours in the nutplate when the nutplate is used to create the annular groove for receipt of the face gasket.

When the groove for the annular face gasket is fixed in size and position, which is typical of existing and earlier designs, this forces a more precise sizing and shaping of the gasket. This design constraint creates a risk that the gasket will not properly seat in the groove and will not have the necessary compression fit and compression characteristics to establish the necessary and desired seal.

In designs which use some type of retainer to help capture the gasket, securing of the retainer to the nutplate becomes a consideration. If this approach is selected in order fix the position of the receiving groove, the retainer could be spot welded to the nutplate, but this presents a challenge due to the placement locations for the welding electrodes. There is also a limitation as to the sequence of steps. With a seamless (roll over) design, the retainer is located where it would interfere with the roller mechanism that is used to roll over the shell material around and over the peripheral edge of the nutplate. Accordingly, the retainer must be spot welded after the roll over operation is completed and this further complicates the welding procedure because it is difficult to place the welding electrodes on both sides of the nutplate and retainer combination after the nutplate has been joined to the outer shell.

After consideration of these various limitations, problems, and drawbacks with current filter designs, it will be appreciated that the present invention provides a number of improvements and advantages. The present invention uses a floating retainer which is thus able to be self-centering. The retainer captures the inside diameter of the face gasket and the rolled lip or inner peripheral wall portion of the shell captures the outside diameter of the gasket as that lip of the shell is rolled over the upper and outer peripheral edge of the nutplate. There is a side-to-side compression fit between the gasket and the retainer and between the gasket and the shell and this compression fit of the gasket helps to hold the retainer and gasket in the filter assembly until the filter assembly is threadedly assembled onto the mounting head.

SUMMARY OF THE INVENTION

A fluid filter for the filtering of a circulating fluid according to one embodiment of the present invention comprises an outer shell including a peripheral edge which defines an open end of the outer shell, a filter cartridge positioned within the outer shell, a nutplate assembled to the outer shell adjacent the open end, a floating retainer positioned adjacent the nutplate and forming in cooperation with the peripheral edge an annular receiving channel and an annular gasket received within the channel and being constructed and arranged relative to the channel to create a compressive fit against the retainer and a compressive fit against the peripheral edge.

DESCRIPTION OF THE PREFERRED EMBODIMENT

Figure 1:
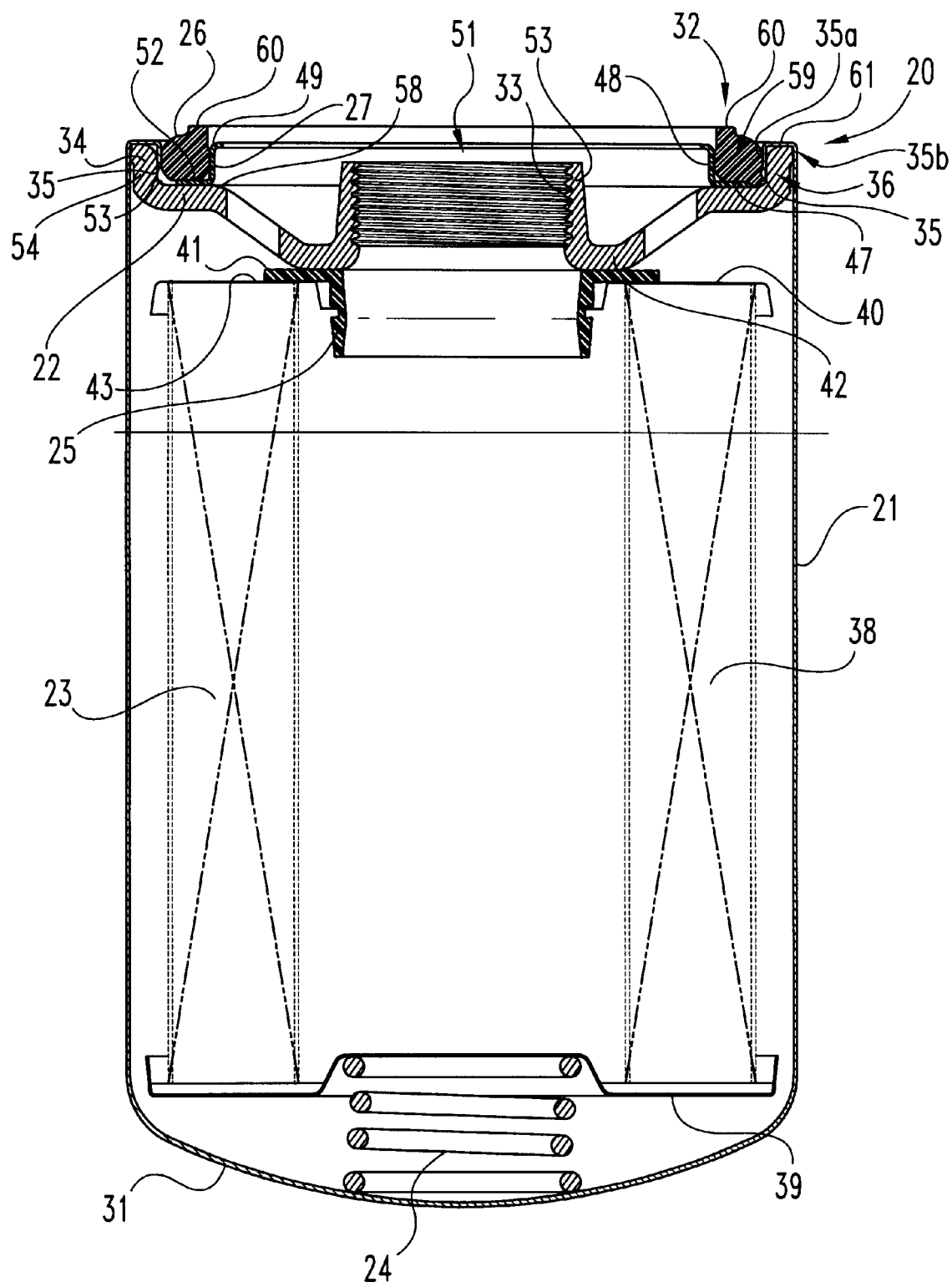
FIG. 1 is a front elevational view in full section of a fluid filter according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a fluid filter 20 which includes an outer shell 21, nutplate 22, filter cartridge 23, spring 24, inner elastomeric gasket 25, outer elastomeric gasket 26, and retainer 27. Outer shell 21 is a metal, annular member with a closed end 31 and axially opposite thereto an open end 32. Nutplate 22 is a unitary metal stamping with an internally-threaded flow outlet 33 and an outer peripheral edge 34. The free edge 35 of outer shell 21 in cooperation with inner peripheral wall portion 35a define the open end 32. The end portion 35b of shell 21 is rolled over and around the outer peripheral edge 34 of the nutplate 22 so as to securely anchor the nutplate to the outer shell 21 at interface 36. This method of assembly creates what would be described as a seamless construction for the connection between the nutplate and outer shell.

The annular filter cartridge 23 includes a generally cylindrical filtering element 38, a closed endcap 39 which is positioned adjacent to closed end 31 and to spring 24, and an open endcap 40 which is positioned adjacent to the nutplate 22 and inner gasket 25. The outer radial flange 41 of the inner gasket is positioned in tight sealing engagement between the annular bend 42 of the nutplate 22 and the upper surface 43 of open endcap 40.

Fluid filter 20 is constructed and functions in a way typical of earlier filters except for the use of a floating and self-centering retainer 27, the annular outer gasket 26, the rolled over seamless interface 36 between the outer shell and the nutplate and the relationship between the floating retainer 27, gasket 26, and the shell/nutplate interface 36. While these novel components and their novel relationships shall be described in greater detail, the reference to the otherwise typical construction means that the flow paths, in and out, and the filtering function are typical of earlier fluid filters of this general type. Accordingly, the components such as the spring 24, endcaps 39 and 40, inner gasket 25, nutplate 22, and outer shell 21 generally perform in their normal and typical fashion.

Figure 2:
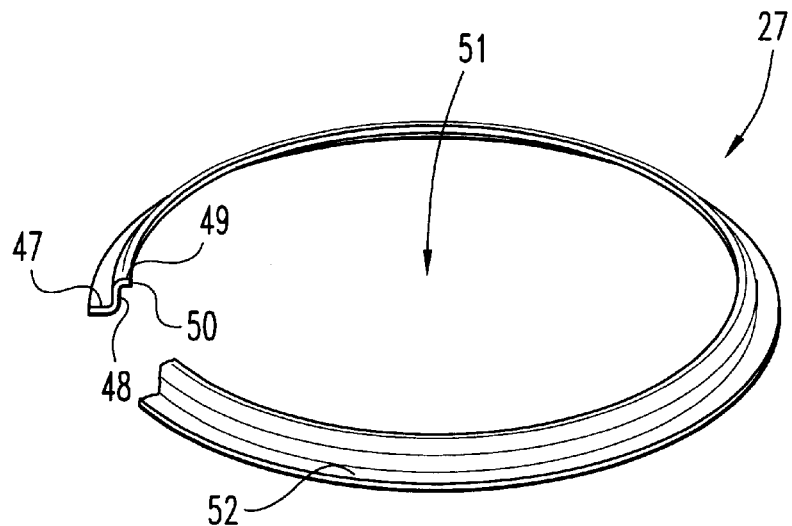
FIG. 2 is a partial, perspective view of an annular retainer comprising one component of the FIG. 1 fluid filter.

With reference to the detailed illustration of FIG. 2, retainer 27, is a unitary annular component which is configured as a hollow ring with an outer, annular and radially-extending flange 47, cylindrical sidewall 48, and an inwardly-directed upper radial lip 49. The retainer 27 is a plastic member which can be fabricated as a molded, stamped, or vacuum formed component. The inner circular edge 50 of lip 49 defines center opening 51 which is located generally concentric with flow outlet 33 in the final assembly of fluid filter 20. Flange 47 is substantially flat and spaced apart from lip 49 by sidewall 48. The upper surface 52 of flange 47 supports outer gasket 26. As is illustrated in FIG. 1, the outside diameter dimensional size of flange 47 is smaller than the inside diameter dimensional size of inner surface 53 of the raised cylindrical wall 54 of nutplate 22. The smaller diameter size of flange 47 relative to surface 53 allows retainer 27 to float radially on upper surface 58 of nutplate 22 relative to inner surface 53. This lateral or radial shifting (i.e., floating) which is permitted due to the shaping and sizing of the retainer relative to the nutplate means that the retainer 27 is self-centering or self-aligning as it assembles with the outer gasket 26 into the nutplate 22 and into the remainder of the fluid filter 20.

Sidewall 48 which is generally cylindrical and flange 47 in combination with upper surface 58, wall 54, and free edge 35 define an annular receiving channel 59 with a U-shaped lateral cross section for receipt of gasket 26. Gasket 26 is sized such that there is a radial compression fit between the gasket and wall portion 35a (specifically that portion of the outer shell which is wrapped or rolled over peripheral edge 34 and wall 54 and against surface 53) and between the gasket 26 and sidewall 48. The compression forces directed radially inwardly are equally and oppositely balanced with the compression forces directed radially outwardly and this is enabled by the floating, self-centering nature of the retainer 27 relative to the nutplate 22. This compression fit, prior to the assembly of the fluid filter onto the mounting head, also means that the assembly of the gasket into the retainer and into the nutplate will be easy to achieve and, once achieved, the gasket 26 and retainer 27 will remain in their assembled condition relative to the remainder of the fluid filter. In this fashion, the fluid filter can be handled and assembled onto the mounting head without concern that either the retainer or the gasket will come free.

The size and shape of annular gasket 26 is such that when placed in contact against flange 47, an upper annular portion 60 extends axially above lip 49 and above the end surface 61 of outer shell 21. As the fluid filter 20 is assembled onto a mounting base or head, the surface of the mounting head, whether flat or contoured, pushes axially on the upper annular portion 60 which is then compressed in the direction of flange 47. This axial compression creates a sealed interface between gasket 26 and flange 47 and a sealed interface between gasket 26 (particularly portion 60) and the mounting head. This axial compression of gasket 26 also increases the degree of radial, side compression between gasket 26 and sidewall 48 and between gasket 26 and the rolled over portion of shell 21 (i.e., wall portion 35a, which is in contact with inner surface 53. It will be understood that any possible leakage path from the interior of the fluid filter 20 to the exterior is sealed by the compression of gasket 26 against any assembly interface which could result in fluid leakage therethrough.

The outer gasket 26 can have a variety of lateral cross sectional shapes so long as its size and shape results in sufficient side-to-side as well as top-to-bottom compression in order to create the necessary sealed interface (i.e., liquid-tight) against each structural surface which contacts the gasket. According to the present invention, regardless of the gasket variations which may be employed, the retainer 27 continues to be a floating, self-centering member.

Figure 3:
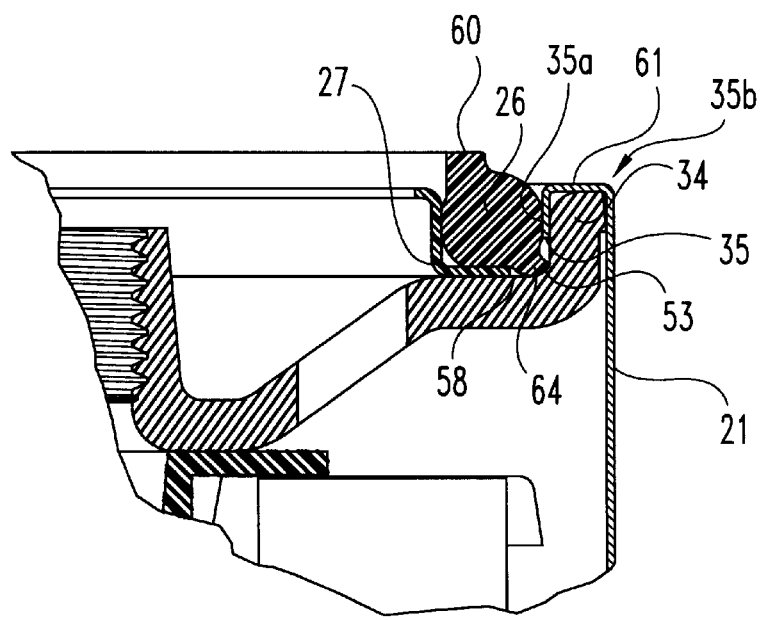
FIG. 3 is a partial, enlarged detail in full section of a face gasket comprising one component of the FIG. 1 fluid filter.

One optional feature of the design of gasket 26 is to shape or configure the gasket in lateral cross section with a plurality of lip extension 64 (see FIG. 3). In the preferred embodiment of the present invention there are a total of five equally-spaced lip extensions 64 and each one is constructed and arranged to fit against inner surface 53 and upper surface 58 of nutplate 22. The positioning of each lip extension 64 up against inner surface 53 also positions each lip extension 64 beneath free edge 35 of outer shell 21. Positioning the lip extensions in this manner creates an interlocking fit for the gasket which helps to hold, not only the gasket 26 in position but also the retainer 27, due to the side-to-side compression fit between the gasket 26 and retainer 27. The use of the optional lip extension 64 simply adds another means or technique of holding the gasket 26 and retainer 27 in position until the fluid filter 20 is threadedly mounted onto the head.

The design of the disclosed fluid filter 20 according to the present invention which includes the floating, self-centering retainer 27, does not require any increase in the wall thickness of the outer shell material and a thicker or heavier nutplate can be used. In those applications requiring greater than a 300 psi burst rating, a thicker nutplate (greater than 0.160 inches) is required so as to reduce the permitted deflection of the nutplate. Thinner nutplates must be used when a capturing groove for the gasket is required to be formed in the nutplate. The retainer 27 of the present invention is not welded nor bonded to the nutplate, though the gasket 26 can be molded to the retainer 27 as yet a further option of the present invention. The present invention eliminates the dependence on any grooved design in the head and shifts it to the removable retainer 27. Greater flexibility is provided by the present invention since the disclosed design can be used with virtually any mounting head configuration which may be encountered in actual use.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid filter comprising:
   an outer shell including a peripheral wall portion which defines an open end of said outer shell;
   a filter cartridge positioned within said outer shell;
   a nutplate assembled to said outer shell adjacent said open end;
   a floating retainer positioned adjacent said nutplate and forming in cooperation with said peripheral wall portion an annular receiving channel, said floating retainer being constructed and arranged as a unitary member including an annular flange positioned on said nutplate and spaced apart from said peripheral wall portion, a radial lip defining a center opening of said floating retainer and a cylindrical sidewall disposed between said annular flange and said radial lip; and
   an annular gasket received within said receiving channel and being constructed and arranged relative to said receiving channel to create a compressive fit against said retainer and a compressive fit against said peripheral wall portion.

2. The fluid filter of claim 1 wherein said nutplate is a unitary metal stamping.

3. The fluid filter of claim 2 wherein said peripheral wall portion includes a free edge and wherein said annular gasket is an elastomeric member and includes a lip extension which is positioned adjacent said free edge to help retain said annular gasket in said receiving channel.

4. The fluid filter of claim 3 wherein said outer shell has an end surface and said annular gasket is constructed and arranged to extend axially beyond said end surface.

5. The fluid filter of claim 1 wherein said nutplate is a unitary metal stamping.

6. The fluid filter of claim 1 wherein said peripheral wall portion includes a free edge and wherein said annular gasket is an elastomeric member and includes a lip extension which is positioned adjacent said free edge to help retain said annular gasket in said receiving channel.

7. The fluid filter of claim 1 wherein said outer shell has an end surface and said annular gasket is constructed and arranged to extend axially beyond said end surface.

8. A fluid filter comprising:
   an outer shell having a closed first end and opposite thereto an open second end defined by a peripheral wall portion, and having a surrounding sidewall defining a hollow interior;
   a filter cartridge positioned in said hollow interior;
   a nutplate positioned in said open second end and being assembled to said outer shell with said peripheral wall portion being formed over a portion of said nutplate;
   a floating annular retainer positioned adjacent said nutplate and forming in cooperation with said formed peripheral wall portion an annular receiving channel, said floating annular retainer being constructed and arranged as a unitary member including an annular flange positioned on said nutplate and spaced apart from said peripheral wall portion, a radial lip defining a center opening of said floating annular retainer and a cylindrical sidewall disposed between said annular flange and said radial lip; and
   an annular gasket received by said receiving channel and being sized relative to said receiving channel such that there is a compressive fit between said annular gasket and said retainer and a compressive fit between said annular gasket and said peripheral wall portion.

9. The fluid filter of claim 8 wherein said nutplate is a unitary metal stamping.

10. The fluid filter of claim 9 wherein said peripheral wall portion includes a free edge and wherein said annular gasket is an elastomeric member and includes a lip extension which is positioned adjacent said free edge to help retain said annular gasket in said receiving channel.

11. The fluid filter of claim 10 wherein said outer shell has an end surface and said annular gasket is constructed and arranged to extend axially beyond said end surface.

12. The fluid filter of claim 8 wherein said nutplate is a unitary metal stamping.

13. The fluid filter of claim 8 wherein said peripheral wall portion includes a free edge and wherein said annular gasket is an elastomeric member and includes a lip extension which is positioned adjacent said free edge to help retain said annular gasket in said receiving channel.

14. The fluid filter of claim 8 wherein said outer shell has an end surface and said annular gasket is constructed and arranged to extend axially beyond said end surface.

15. A fluid filter comprising:
   an enclosing shell;
   a filter cartridge positioned in said enclosing shell;
   a nutplate assembled to said enclosing shell and including a cylindrical outer wall;
   a retainer positioned on said nutplate and spaced apart from said enclosing outer shell, said retainer in cooperation with said enclosing shell forming a receiving channel, said retainer being constructed and arranged to be laterally movable relative to said cylindrical outer wall, such that as said retainer moves closer to a first portion of said cylindrical outer wall, said retainer moves away from a second portion of said cylindrical outer wall; and a gasket disposed within said receiving channel and being sized and shaped to create sealed interfaces between said gasket and said retainer and between said gasket and said enclosing shell.

16. The fluid filter of claim 15 wherein said nutplate is a unitary metal stamping.

17. The fluid filter of claim 15 wherein said gasket is an annular elastomeric member and includes a lip extension which is positioned adjacent a free edge of said enclosing shell to help retain said gasket in said receiving channel.

18. A fluid filter comprising:

an outer shell including a peripheral wall portion which defines an open end of said outer shell;

a filter cartridge positioned within said outer shell;

a nutplate assembled to said outer shell adjacent said open end;

a floating retainer positioned on said nutplate and spaced apart from said peripheral wall portion, said retainer forming in cooperation with said peripheral wall portion an annular receiving channel; and an annular gasket received within said receiving channel and being constructed and arranged relative to said receiving channel to create a compressive fit against said retainer and a compressive fit against said peripheral wall portion.

19. A fluid filter comprising:

an outer shell having a closed first end and opposite thereto an open second end defined by a peripheral wall portion, and having a surrounding sidewall defining a hollow interior;

a filter cartridge positioned in said hollow interior;

a nutplate positioned in said open second end and being assembled to said outer shell with said peripheral wall portion being formed over a portion of said nutplate;

a floating annular retainer positioned on said nutplate and spaced apart from said formed peripheral wall portion, said retainer forming in cooperation with said formed peripheral wall portion an annular receiving channel; and an annular gasket received by said receiving channel and being sized relative to said receiving channel such that there is a compressive fit between said annular gasket and said retainer and a compressive fit between said annular gasket and said peripheral wall portion.

\* \* \* \* \*

UNITED STATES PATENT AND TRADEMARK OFFICE
CERTIFICATE OF CORRECTION

PATENT NO. : 6,019,229
DATED : February 1, 2000
INVENTOR(S) : Prabhakar B. Rao

It is certified that error appears in the above-identified patent and that said Letters Patent is hereby corrected as shown below:

Column 4, line 46, insert --) -- after "35a".

Signed and Sealed this

Sixth Day of February, 2001

Attest:

Q. TODD DICKINSON

*Attesting Officer*  *Director of Patents and Trademarks*